United States Patent
Hauser et al.

(10) Patent No.: US 6,457,956 B1
(45) Date of Patent: Oct. 1, 2002

(54) PISTON PUMP

(75) Inventors: Manfred Hauser, Schwieberdingen; Norbert Alaze, Markgroenningen; Walter Kremsreiter, Hindelang; Thorsten Duermeier, Vaihingen/Enz; Juergen Reiner, Gruenebach; Werner Rittler, Immenstadt; Ursula Eckstein, Schwieberdingen; Andreas Weh, Durach; Erika Mank, Ludwigsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,691

(22) PCT Filed: Apr. 6, 2000

(86) PCT No.: PCT/DE00/01098

§ 371 (c)(1), (2), (4) Date: Apr. 16, 2001

(87) PCT Pub. No.: WO00/73658

PCT Pub. Date: Dec. 7, 2000

(30) Foreign Application Priority Data

May 29, 1999 (DE) .......................................... 199 24 774

(51) Int. Cl.[7] ................................................ F04B 37/00
(52) U.S. Cl. ...................................... 417/470; 417/549
(58) Field of Search ................................ 417/470, 549, 417/554, 570

(56) References Cited

U.S. PATENT DOCUMENTS

| | | | | | |
|---|---|---|---|---|---|
| 3,229,864 A | * | 1/1966 | Roder | ......................... | 222/321 |
| 3,583,605 A | * | 6/1971 | Corsette | ..................... | 222/321 |
| 5,395,219 A | * | 3/1995 | Hosoya et al. | .............. | 417/454 |
| 6,079,961 A | * | 6/2000 | Schuller et al. | ............. | 417/549 |
| 6,082,244 A | * | 7/2000 | Siegel et al. | .................... | 92/78 |
| 6,126,418 A | * | 10/2000 | Sinnl | ............................ | 417/470 |
| 6,161,466 A | * | 12/2000 | Schuller et al. | ............... | 91/422 |
| 6,224,352 B1 | * | 5/2001 | Hauser et al. | ............... | 417/313 |
| 6,283,733 B1 | * | 9/2001 | Merklein et al. | ........... | 417/549 |

\* cited by examiner

Primary Examiner—Charles G. Freay
Assistant Examiner—Han L Liu
(74) Attorney, Agent, or Firm—Ronald E. Greigg

(57) ABSTRACT

The invention relates to a piston pump for a slip-controlled hydraulic vehicle brake system. To make a piston of the piston pump easy and inexpensive to manufacture, the invention proposes that the piston be comprised of a sleeve-like shaped part and a valve seat part that is made of plastic and is press-fitted into the shaped part. A high-pressure-side sealing lip is formed onto the valve seat part and is of one piece with it. By means of a tubular support body, a restoring spring is supported on the valve seat part spaced apart from a valve seat of the valve seat part and spaced apart from the sealing lip, which prevents the valve seat and the sealing lip from being impaired by the force of the restoring spring.

9 Claims, 2 Drawing Sheets

PISTON PUMP

CROSS-REFERENCE TO RELATED APPLICATIONS this application is a 35 USC 371 application of PCT/DE 00/01098 filed on Apr. 06, 2000.

BACKGROUND OF THE INVENTION

The invention relates to a piston pumps and more particularly to an improved piston pump, which is particularly useful as a slip-controlled hydraulic vehicle brake system.

DESCRIPTION OF THE PRIOR ART

Piston pumps of the type with which this invention is concerned as shown, for example in DE 41 07 979 A1. This known piston pump has a pump housing with a pump bore in which a piston can be guided so that it can move axially, directly in this pump bore, or indirectly in a liner inserted into the pump bore. The pump bore and/or the liner constitute a piston guide. In order to deliver fluid, the piston can be driven to execute a reciprocating stroke motion. The known piston pump has a drive element in the form of a cam that can be driven to rotate, whose circumference the piston rests against with its end. A piston restoring spring inserted into the pump bore presses the piston against the circumference of the cam and holds the piston in contact with the circumference of the cam. In order to control a fluid flow direction through the piston pump, the piston pump has a valve, which is usually embodied as a spring-loaded check valve and constitutes an inlet or outlet valve of the piston pump.

SUMMARY OF THE INVENTION

The piston of the piston pump according to the invention has a valve seat part that has a valve seat of the valve controlling the fluid flow direction through the piston pump and a piston seal, which is of one part with the valve seat part and seals the piston, in particular on its high-pressure side, in the piston guide. This eliminates the need for a separate seal and saves the costs of manufacturing a groove to contain the seal and inserting the seal into the groove.

In addition, the piston of the piston pump according to the invention has a support body, for example a tubular or annular support body which is engaged by the restoring spring and by means of which the restoring spring presses the piston against the circumference of the cam driving the piston or against another drive element. The support body is supported against the valve seat part spaced apart from the valve seat and spaced apart from the piston seal of the valve seat part. The support body produces a uniformly distributed transmission of the force exerted on the valve seat part by the restoring spring and thereby prevents a deformation or damage to the valve seat part, particularly when this valve seat part is comprised of plastic. Since the support body introduces the force of the restoring spring into the valve seat part spaced apart from the valve seat and from the piston seal, the valve seat and the piston seal are protected completely or as much as possible from the force exerted by the restoring spring. A deformation of or damage to the valve seat and the piston seal by the force of the restoring spring is prevented; the use of the support body prevents the function and tightness of the valve seat and the piston seal from being impaired. The support body according to the invention permits the force of the restoring spring to be introduced into the valve seat part with a sufficient distance from the valve seat and the piston seal despite the usually small dimensions of the pistons of piston pumps for slip-controlled hydraulic vehicle brake systems. Pistons of this kind may have a diameter of 5 mm, for example.

The invention permits a small and compact design of the piston pump. Other advantages are the fact that it is manufactured from simple and inexpensively producible components and is comprised of a small number of components. The piston is optimized with regard to its manufacture while simultaneously retaining its full functionality.

The support body for the restoring spring may simultaneously constitute a retainer and/or a guide for a valve closing body of the valve, which is affixed to the piston and controls the fluid flow direction through the piston pump. When this valve is embodied as a spring-loaded check valve, a valve closing spring of the valve is supported on the support body. This reduces the number of required components and achieves the fact that the valve closing spring does not have any negative influence on the valve seat.

In order to achieve, despite the small size, the greatest possible distance between the engagement point of the support body with the valve seat part from both the valve seat and the piston seal, the support body may engage the bottom of a groove between the valve seat part and the piston seal, which is embodied as a sealing lip.

The piston can be embodied of one piece with the valve seat part. The piston pump may have a piston that is comprised of a plurality of parts, essentially of two parts. The piston includes a sleeve-like shaped part that is closed at one end and open at the other, which is manufactured, for example, by deep drawing, cold forming, or extrusion. The use of a shaped part has the advantage that it can be simply, rapidly, and inexpensively produced in a single work step. In order to increase wear resistance, the shaped part can be hardened and an additional processing/finishing of the shaped part can be eliminated, in particular a costly cutting machining of the shaped part. The shaped part rests with its closed end against the circumference of the cam driving the piston or against another drive element.

The valve seat part is inserted, for example press-fitted, into the open end of the shaped part and can be manufactured inexpensively and simply, for example out of plastic. If the valve seat part is made of plastic, for example, the shaped part into which the valve seat part is inserted lends the valve seat part sufficient strength to withstand the stresses that occur during operation of the piston pump. The valve seat part has the valve seat for the valve that controls the fluid flow direction through the piston pump.

The piston pump according to the invention is particularly provided as a pump in a brake system of a vehicle and is used in the control of pressure in wheel brake cylinders. The abbreviations ABS, ASR, VDC, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid from a storage tank into a wheel brake cylinder or a plurality of wheel brake cylinders (ASR, VDC, or EHB). The pump is required, for example, in a brake system with wheel slip control (ABS or ASR) and/or a brake system serving as a steering aid (VDC) and/or an electrohydraulic brake system (EHB). With wheel slip control (ABS or ASR), for example, a locking of the wheels of the vehicle during a braking event when there is strong pressure on the brake pedal (ABS) and/or a spinning of the driven wheels of the vehicle when there is strong pressure on the gas pedal (ASR)

can be prevented. In a brake system that serves as a steering aid (VDC), a brake pressure is built up in one or more wheel brake cylinders independently of an actuation of the brake pedal or gas pedal, for instance to prevent the vehicle from breaking out of the path desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

BRIEF DESCRIPTION OF THE DRAWINGS

The foregoing and other features and advantages of the invention will be apparent from the detailed description contained herein below, taken in conjunction with the drawings, in which.

DESCRIPTION OF THE PREFERRED EMBODIMENT

Figure 1:
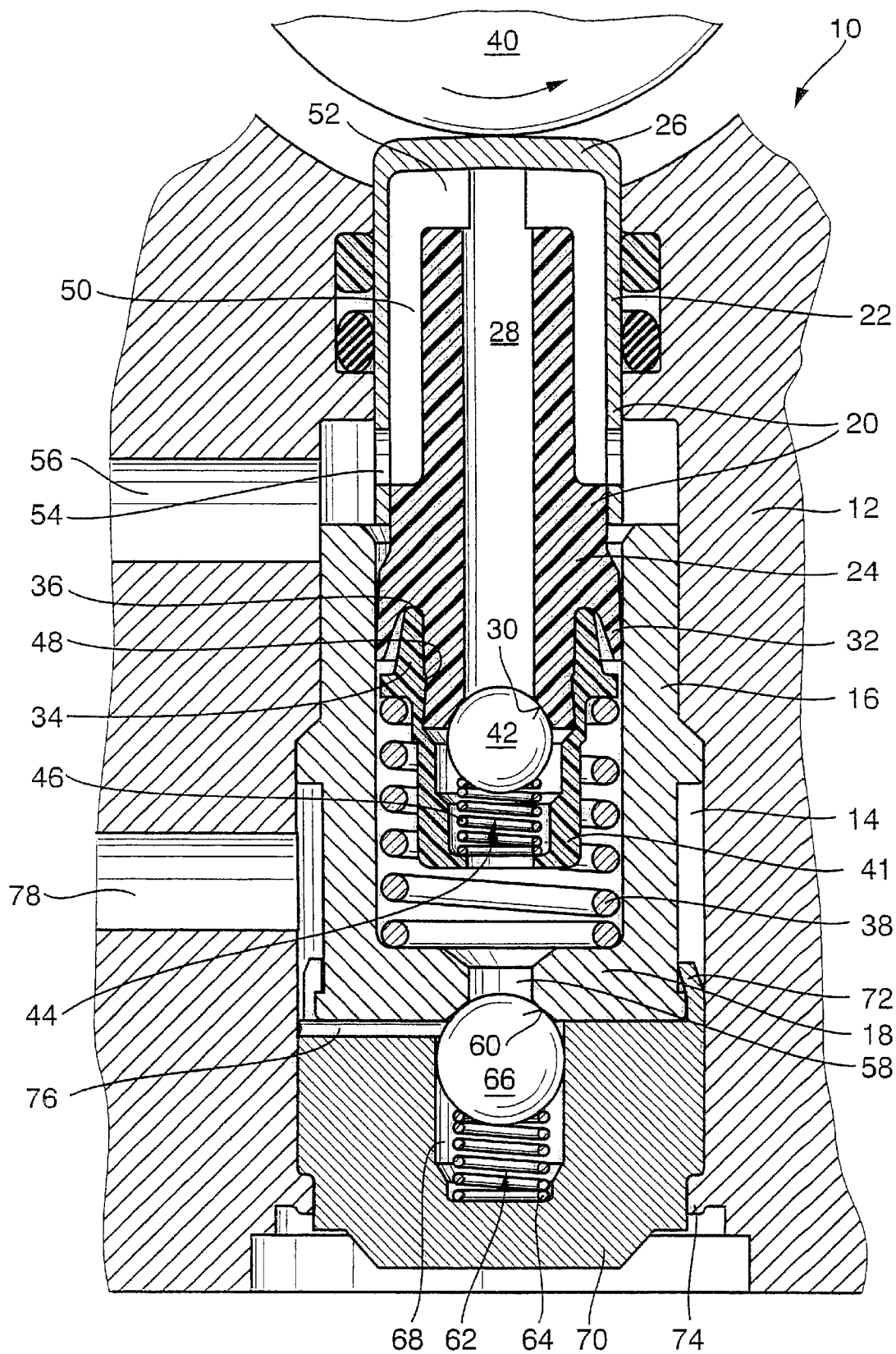
FIG. 1 is a longitudinal axis section through a piston pump according to the invention.

The piston pump 10 according to the embodiment of the invention shown in FIG. 1 is inserted into a hydraulic block 12 which constitutes a pump housing and will be referred to as such below. The hydraulic block 12, of which only a fraction surrounding the piston pump 10 is shown in the drawing, contains a hydraulic control circuit of a slip-controlled vehicle brake system that is otherwise not shown. In addition to the piston pump 10, other hydraulic components such as solenoid valves are inserted into the hydraulic block 12 and hydraulically connected to one another.

The hydraulic block comprising the pump housing 12 is provided with a pump bore 14 into which a hollow cylindrical liner 16 is inserted, which has a liner bottom 18 that is of one piece with it.

The piston pump 10 has a piston 20, which is guided so that it can move axially with a part of its length in the liner 16 and another part of its length, which protrudes from the liner 16, in the pump bore 14. The pump bore 14 and the liner 16 constitute a piston guide 14, 16. The piston 20 is essentially composed of two parts; it has a sleeve-like shaped part 22 and a valve seat part 24 inserted into the shaped part 22. The shaped part 22 is produced from a metal plate by means of deep drawing; it has the form of a hollow cylindrical sleeve, which is closed at one end by an end wall 26 that is of one piece with the shaped part 22. In order to increase wear resistance, the shaped part 22 is hardened and an additional processing is not carried out; the surface quality of the shaped part 22 is sufficient.

The valve seat part 24 press-fitted into the shaped part 22 is comprised of plastic, is approximately cylindrical, and protrudes with a part of its length out from the shaped part 22. The valve seat part 24 is perforated by a continuous axial hole 28, which opens out with a conical valve seat 30 at an end of the valve seat part 24 protruding from the shaped part 22.

The valve seat 24 has a circumferential sealing lip 32 that is of one piece with it in its region protruding from the shaped part 22. The sealing lip 32, which constitutes a piston seal, has the form of a hollow truncated cone and points with a free edge in the direction of the liner bottom 18. The sealing lip 32 rests with initial stress against the inside of the liner 16 and seals the piston 20 in the liner 16. The sealing lip 32 constitutes a high-pressure-side piston seal; it is internally acted on by fluid (brake fluid) to be supplied with the piston pump 10. If the pressure of the brake fluid increases during delivery, the sealing lip 32 acted on by the brake fluid is pressed more forcefully against the liner 16 in addition to its initial stress so that the sealing lip 32 also produces a reliable seal under high pressure. At a low or constant pressure, the sealing lip 32 produces a seal due to its initial stress. This achieves a reliable seal at different brake fluid pressures that occur during operation and simultaneously achieves a low friction and low wear of the sealing lip 32.

A tubular support body 34 is disposed on the piston 20 which engages in the axial direction with a base 36 of the sealing lip 32 at the transition from the sealing lip 32 into the valve seat part 24. A piston restoring spring 38 in the form of a helical compression spring, which is inserted into the liner 16 and is supported on the liner bottom 18, presses against the support body 34 and by means of the support body 34, presses the piston 20 with the end wall 26 against the circumference of a cam 40 (drive element) that can be driven to rotate by an electric motor. The rotating driving of the cam 40, drives the piston 20 into an axially reciprocating stroke motion in the pump bore 14 and in the liner 16 (piston guide 14, 16), which generates a delivery of brake fluid in an intrinsically known manner. Through the use of the support body 34, the force of the restoring spring 38 is introduced in a uniformly distributed manner into the valve seat part 24 and as a result, a deformation of or damage to the valve seat part 24 is prevented. Through the engagement of the support body 34 with the base 36 of the sealing lip 32, the force of the restoring spring 38 is introduced into the valve seat part 34 spaced apart from the valve seat 30 so that a deformation of the valve seat 30 by the force of the restoring spring 38 is prevented and an impairment to the sealing action of the valve seat 30 is prevented. Likewise, through the introduction of the force of the restoring spring 38 onto the base 36 of the sealing lip 32, the sealing lip 32 is not impaired by the force of the restoring spring 38 and a sealing action of the sealing lip 32 is not influenced by the force of the restoring spring 32.

Distributed equidistantly around the circumference, three holding arms 41 protrude from the support body 34 in an axially parallel fashion, whose free ends are angled radially inward. A valve closing body in the form of a valve ball 42 is contained between the holding arms 41 and is guided so that it can move axially. The holding arms 41 of the support body 34 constitute a retainer and a guide for the valve ball 42. A valve closing spring 46 in the form of a helical compression spring presses the valve ball 42 against the valve seat 30 on the valve seat part 24 of the piston 20; this spring is supported against the inwardly angled ends of the holding arms 41. The support body 34 has an inwardly protruding circumferential snap bead 48, which rests in a complementary indentation of the valve seat part 24. The support body 34 is thereby attached to the valve seat part 24 of the piston 20 by means of a snap connection 48. The attachment of the support body 34, including the inlet valve 44, to the piston 20 by means of a snap connection 48 facilitates the handling of the piston 20 before and during the assembly of the piston pump 10. During operation, the support body 34 is held against the piston 20 by the restoring spring 38 so that the snap connection 48 is of subordinate importance after the assembly of the piston pump 10.

To enable the entry of brake fluid, the valve seat part 24 is provided with axial grooves 50 on the circumference of a section that is press-fitted into the shaped part 22 and is provided with radial grooves 52 on the end face, which lead from through openings 54 punched out of a circumference wall of the shaped part 22 to the axial hole 28 of the valve seat part 24. The fluid inlet is produced by means of an inlet bore 56, which is let into the pump housing 12 and feeds radially into the pump bore 14, and then through the through openings 54 and the axial and radial grooves 50, 52, into the axial hole 28 to the inlet valve 44.

The discharge takes place by means of a center hole 58 in the liner bottom 18, which opens out with a conical valve seat 60 of an outlet valve 62 at an outside of the liner bottom 18. Like the inlet valve 44, the outlet valve 62 is embodied as a spring-loaded check valve. A valve closing spring 64 in the form of a helical compression spring presses a valve closing body in the form of a valve ball 66 against the valve seat 60. The valve ball 66 and the valve closing spring 64 are inserted into an axial blind hole 68 in an end plug 70 that is connected to the liner bottom 18 with a circumferential crimp 72. The end plug 70 is connected in the pump bore 14 and sealed in a pressure-tight manner by means of a circumferential caulking 74 of the pump housing 12. The discharge of brake fluid flowing out through the outlet valve 62 takes place by means of radial conduits 76 arranged in a star pattern between the end plug 70 and the liner bottom 18, into the pump bore 14, and from there through an outlet bore 78 let into the pump housing 12 radial to the pump bore 14.

Description of the Second Exemplary Embodiment

Figure 2:
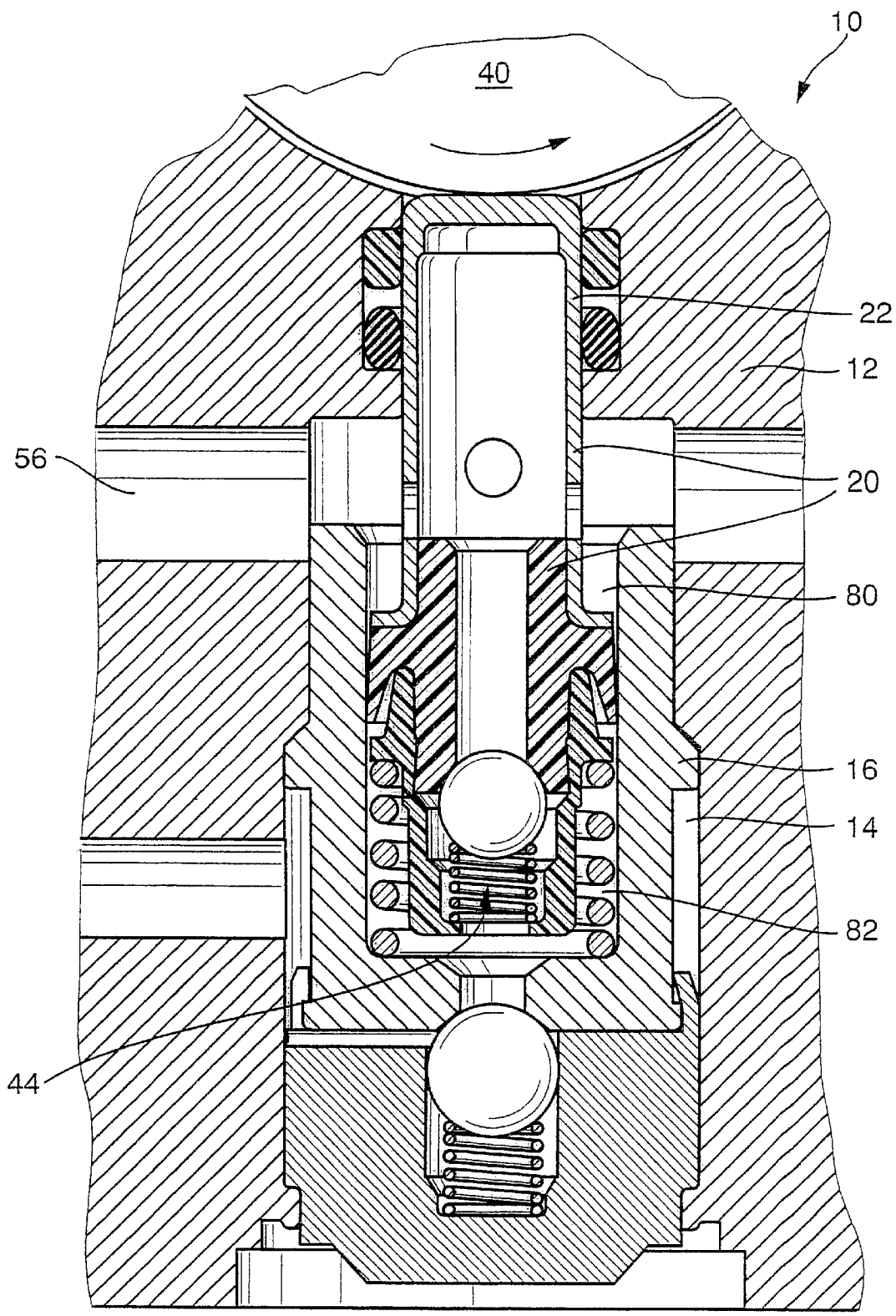
FIG. 2 is a view similar to FIG. 1 and showing an alternative embodiment of the invention.

For the description of the piston pump 10 according to the embodiment of the invention shown in FIG. 2, components that are the same as those in FIG. 1 are provided with the same reference numerals. In contrast to the piston pump 10 from FIG. 1, which is embodied as a simple piston pump, the piston pump 10 from FIG. 2 is embodied as a stepped piston pump. This means that inside liner 16 the piston 20 of the piston pump 10 from FIG. 2 is guided and sealed on a larger diameter than outside the liner 16 in the pump bore 14 in the pump housing 12. Because it is embodied as a stepped piston pump, the piston pump 10 from FIG. 2 has an annular space 80 encompassing the shaped part 22 of the piston 20 in the pump bore 14 and in the liner 16. A volume of this annular chamber 80 changes during the reciprocating stroke motion of the piston 20. The volume of the annular chamber 80 increases when the piston 20 is pressed deeper into the liner 16 by the cam 40, i.e. during a delivery stroke of the piston pump 10. The increase of the volume of the annular chamber 80 during the delivery stroke causes brake fluid to be aspirated through the inlet bore 56. During the return stroke of the piston 20, the volume of the annular chamber 80 does in fact decrease, but a volume of a displacement chamber 82 of the piston pump 10 increases by a greater amount so that even during the return stroke, brake fluid is aspirated through the inlet valve 44 that is open during the return stroke. The embodiment of the piston pump 10 as a stepped piston pump evens out the intake volume flow and improves a filling of the displacement chamber 82 and an efficiency of the piston pump 10.

Otherwise, the piston pump shown in FIG. 2 is embodied the same as the piston pump 10 shown in FIG. 1 and functions in the same manner. In order to avoid repetition, reference is made to the above explanations of the first exemplary embodiment of the invention with regard to these shared traits.

The foregoing relates to preferred exemplary embodiments of the invention, it being understood that other variants and embodiments thereof are possible within the spirit and scope of the invention, the latter being defined by the appended claims.

We claim:

1. A piston pump comprising a pump housing with a piston guide, a piston that is guided so that it can move axially in the piston guide, a drivable drive element against which the piston rests and with which the piston can be driven to execute a reciprocating stroke motion in the axial direction, a restoring spring that engages the piston and presses the piston against the drive element, and a valve which is connected to the piston and controls a fluid flow direction through the piston pump, said piston (20) including a valve seat part (24), which has a valve seat (30) of the valve (44) that controls the fluid flow direction through the piston pump (10), said valve seat part (24) having a piston seal (32) which is of one piece with the valve seat part (24) and seals the piston (20) in the piston guide (14, 16), and said piston (20) having a support body (34) which is engaged by the restoring spring (38), wherein the support body (34) engages the valve seat part (24) spaced apart from the valve seat (30) and the piston seal (32).

2. The piston pump according to claim 1, wherein the valve seat part (24) is a plastic part.

3. The piston pump according to claim 1, wherein the piston seal has a circumferential sealing lip (32).

4. The piston pump according to claim 1, wherein the support body (34) is embodied as a retainer and/or guide (41) for a valve closing body (42) of the valve (44) controlling the fluid flow direction through the piston pump (10).

5. The piston pump according to claim 4, wherein the valve (44) is embodied as a check valve.

6. The piston pump according to claim 5, wherein the check valve (44) has a valve closing spring (46), which is supported against the valve support body (34) that is embodied as a retainer (41) for the valve closing body (42) of the valve (44) that controls the fluid flow direction through the piston pump (10), and presses the valve closing body (42) against the valve seat (30) of the valve seat part (24).

7. The piston pump according to claim 1, wherein the piston (20) has a snap connection or a detent connection (48) which is used to connect the support body (34) to the valve seat part (24).

8. The piston pump according to claim 3, wherein the valve seat part has a groove between itself and the sealing lip (32), wherein the groove has a bottom (36) and the support body (34) engages the bottom (36) of this groove.

9. The piston pump according to claim 1, wherein the piston (20) is embodied of several parts and has a sleeve-like shaped part (22) that is closed at one end and is open at the other end, which rests with its closed end against the drive element (40) and has the valve seat part (24) inserted into its open end.

* * * * *